US012782208B2

(12) United States Patent
Froggatt et al.

(10) Patent No.: US 12,782,208 B2
(45) Date of Patent: Nov. 3, 2026

(54) LOAD CELL FOR MEASURING TENSION AND THRUST FORCES

(71) Applicant: DYWIDAG-Systems International GmbH, Unterschleissheim (DE)

(72) Inventors: Christopher Froggatt, Congleton (GB); David Ranald Warburton, Beaumaris (GB); James Stewart, Stockport (GB); Christian Glaser, Munich (DE); Simon Jackson, North Wales (GB); Matthias Wild, Munich (DE)

(73) Assignee: DYWIDAG-Systems International GmbH, Unterschleissheim (DE)

( * ) Notice: Subject to any disclaimer, the term of this patent is extended or adjusted under 35 U.S.C. 154(b) by 323 days.

(21) Appl. No.: 18/281,398

(22) PCT Filed: Mar. 12, 2021

(86) PCT No.: PCT/EP2021/056404

§ 371 (c)(1),
(2) Date: Sep. 11, 2023

(87) PCT Pub. No.: WO2022/188997

PCT Pub. Date: Sep. 15, 2022

(65) Prior Publication Data

US 2024/0151598 A1 May 9, 2024

(51) Int. Cl.
*G01L 1/22* (2006.01)

(52) U.S. Cl.
CPC .......... *G01L 1/2237* (2013.01); *G01L 1/2262* (2013.01)

(58) Field of Classification Search
CPC .... G01L 1/2231; G01L 1/2237; G01L 1/2262
See application file for complete search history.

(56) References Cited

U.S. PATENT DOCUMENTS 3,035,240 A * 5/1962 Starr .......................... G01L 1/02 338/42
3,365,689 A 1/1968 Kutsay
4,094,192 A * 6/1978 Watson ................. G01L 5/1627 73/1.15
4,162,628 A * 7/1979 Oetjen ................. G01G 19/021 73/862.622
4,453,422 A 6/1984 Yorgiadis
(Continued)

FOREIGN PATENT DOCUMENTS

CN 201867274 U * 6/2011
CN 112414606 A * 2/2021 ........... G01L 5/1627
(Continued)

OTHER PUBLICATIONS

International Search Report filed in PCT/EP2021/056404 mailed Jul. 12, 2021.

*Primary Examiner* — Octavia Hollington
(74) *Attorney, Agent, or Firm* — Rankin, Hill & Clark LLP

(57) ABSTRACT

A load cell includes an annular base unit where an axial height of the annular base unit is smaller than a diameter of the annular base unit. The annular base unit has a plurality of mounting portions. A plurality of strain gages are located in the plurality of mounting portions. The annular base unit includes a plurality of sections having a Young's modulus different from the Young's modulus of the material of the base unit.

18 Claims, 6 Drawing Sheets

(56) References Cited

U.S. PATENT DOCUMENTS

| | | | | | |
|---|---|---|---|---|---|
| 4,488,441 | A * | 12/1984 | Ramming | G01L 5/1627 | 73/862.044 |
| 4,823,618 | A * | 4/1989 | Ramming | G01L 5/1627 | 73/862.045 |
| 4,854,179 | A * | 8/1989 | Haggstrom | G01L 1/2231 | 73/862.632 |
| 9,869,597 | B1 * | 1/2018 | Reich | G01L 5/1627 | |
| 10,620,067 | B2 * | 4/2020 | Doll | H05K 1/028 | |
| 10,794,682 | B2 * | 10/2020 | Chen | F16H 25/2209 | |
| 12,544,087 | B2 * | 2/2026 | Wakana | A61B 17/29 | |

FOREIGN PATENT DOCUMENTS

| | | | | |
|---|---|---|---|---|
| DE | 102018113771 | A1 * | 12/2019 | G01G 3/14 |
| JP | 4370717 | B2 * | 11/2009 | |
| JP | 2020128885 | A * | 8/2020 | |

* cited by examiner

LOAD CELL FOR MEASURING TENSION AND THRUST FORCES

The present invention refers to a load cell for measuring tension and thrust forces that act onto the load cell and/or onto elements attached to it.

Such load cells are generally known to measure forces. But, especially in the field of structural fixations, such as ground anchors and the like, the range of possible forces that might act onto the load cell and that have to be measured is large in various different applications. Since a specific load cell is only able to detect forces over a measurement range that is by far smaller than the range of possible forces in all different applications for a load cell, load cells have to be manufactured and selected for each purpose of application individually. For example, for smaller applied forces a thinner load cell may be suitable than for higher applied forces. It is obvious that it is cost and resource intensive to have to manufacture an individual load cell for each application at a structure or the like.

A standard load cell is usually designed for short term applications and cannot be replaced or maintained without unloading the system.

In view of the above, it is the object of the present invention to provide a load cell that is capable of being adapted easily to different applications and to different forces applied to it. It is an additional object of the invention to allow the active sensing components of the system to be replaced whilst the load is still applied.

This object is solved according to the present invention by a load cell, comprising an annular base unit, an axial height of said annular base unit being smaller than a diameter of said annular base unit, said annular base unit having a plurality of mounting portions, and a plurality of strain gages, said plurality of strain gages being located in the plurality of mounting portions, wherein said annular base unit comprises a plurality of sections having a Young's modulus different from the Young's modulus of the material of the base unit.

The annular load cell design is intended to measure forces in structural elements, e.g. a compression force generated from a bearing plate of a ground anchor to the substrate.

In case of measuring the load of tension members, e.g. anchors, the configuration of the tension member may be such that the center axis of the load cell is occupied by the anchor. The load cell may be installed in a symmetrical way. By using a load cell, for example integrated at a ground anchor of a specific structure, an integrated view of the condition of this structure can be provided.

The load cell according to the present invention can easily be adapted to a specific use by varying the sections having a Young's modulus different from the Young's modulus of the material of the base unit. This may be performed by choosing a different material having a different Young's modulus and/or by changing the number and/or size of these sections, i.e. by changing the ratio of the material of the base unit to the material of the sections. Doing so, the target Young's modulus of the entire load cell is chosen such that the measurement range for the cell is within the elastic limit of the cell material and the range of the strain gages while being sufficiently compliant to give a good signal from the strain gages. It shall be noted here that the center bore of the annular base unit may not be regarded as being part of the plurality of sections.

The invention thus offers a robust and tunable solution at a lower price point with a longer operational lifespan when compared to conventional load cell systems.

Of course, the sections having a Young's modulus different from the Young's modulus of the material of the base unit may not only comprise one single material that is equal for all sections but at least two of the sections may comprise materials different from another. Advantageously, each material of the load cell may be unchanged in the axial direction of the load cell from one axial end to the other axial end. The axial direction shall be understood as a direction perpendicular to the ring-shaped surface of the load cell or as being parallel to a center axis of the annular shape of the base unit. The base unit may be manufactured as a solid piece having one single material.

The axial end surfaces may have a smaller diameter than a maximum diameter of the load cell at its outer circumferential wall. This relief portion at the outer circumference of the axial end surfaces may reduce a beam effect.

The load cell is designed as a ring. The geometry, especially the outer and inner diameter, may be designed dependent on the geometrical restrictions by further components of the respective system where the load cell is applied. The height of the load cell is very small in relation to the diameter of the load cell. For example, the height of the load cell may be less than 25% of the diameter of the load cell. Beside external design restrictions as the geometry of other components, the overall geometry may be based on internal restrictions that is the functionality as a load measuring device in the specified load range.

In the case that the measurement range and the yield strength of the load cell are exceeded, the load cell may be deformed plastically. But, due to the very small height of the load cell, an overall failure of the structural element or entire structure where the load cell is applied may be prevented.

For the base unit of the load cell, a metal material, in particular EN8 steel and in particular a metal material with mechanical corrosion protection, may be chosen. Of course, other metals and materials, such as plastics and/or ceramics, may be suitable as long as they do not compromise the corrosion protection or invoke a cathodic reaction.

In an embodiment of the present invention, the strain gages may be attached to the circumference of the base unit of the load cell to simplify access to the strain gages. This may facilitate to replace the strain gages during the service life of the load cell.

There is the possibility that the load cell will be mounted in such a way as to cause asymmetric loading around the cell axis. To accommodate this issue, multiple strain gages may be mounted on the circumference of the cell. If the gages are measured individually then the asymmetry may be measured and the total load may be calculated by using an averaging process. Alternatively, the individual gages may be wired in such a way as to perform the averaging in an analogue manner prior to measurement in which case a single measurement is performed.

Furthermore, there is the possibility that the load cell is mounted in such a way that the bearing points (the axial surfaces) of the load cell and the measurement region (average Young's modulus of the cell) are not spatially separated. This may have the consequence that, while the cell can accommodate asymmetrical loading, a load that does not smoothly vary around the circumference of the cell will compromise accuracy. This issue may be addressed by arranging for the bearing surfaces to be flat and stiff and/or by adding additional strain gages to the cell and/or by arranging for the forces to be applied in the expected (smoothly varying) manner by introducing suitable gaskets.

The load cell may be adapted to be used in environments of −60° C. to +85° C.

The data gathered by the strain gages may be forwarded to a control unit that may be located on or near the load cell. The control unit may then forward the data to an external device, such as a server or a user terminal, where the data may be analyzed, e.g. to consider if maintenance work on the structure that the load cell is associated with is necessary or not.

Advantageously, at least some sections of said plurality of sections may be formed by holes provided in said annular base unit. The holes may be filled with a specific material, such as a plastic material or a gas, e.g. air, having a Young's modulus different from the Young's modulus of the material of the base unit. The holes may be chosen such that the diameters of the holes are small in relation to the characteristic length of the structures applying the force so that the load cell may behave as if it was made of a solid material with a lower Young's modulus. The effective Young's modulus of the load cell may be selected so that the strain generated from the expected forces matches the sensitivity range of the sensor instruments.

In this regard, at least some of said holes may extend in an axial direction of said annular base unit. Since the strain generated in the load cell from the attached structures is expected to be mainly perpendicular to the axial end surfaces of the load cell and/or parallel to the center bore of the annular base unit, an axial extension of the holes in the base unit may be substantially aligned with the forces introduced into the load cell such that the holes, as the sections of the load cell having a Young's modulus different from the Young's modulus of the material of the base unit, may reduce the stiffness of the load cell against the applied forces effectively.

At least some of said holes may be through holes opening into both axial surfaces of the base unit. By providing through holes extending fully through the base unit of the load cell, a constant Young's modulus of the load cell from one axial end to the other may be provided.

Said holes may be evenly distributed along a circumferential direction of said annular base unit. This may provide an evenly distributed effective Young's modulus of the load cell. For example, a pattern of eight holes may be evenly distributed along a circumferential direction of said annular base unit.

In particular, at least some of said holes may have a circular cross-section. Of course, other shapes may be conceivable, such as square, oval, polygonal etc. Round holes may provide the advantage of using regular drill bits to manufacture the holes which may, in turn, reduce the overall costs of the load cell. Also, the holes may be easily enlarged in their diameter by using a bigger drill bit in order to enlarge the overall area of the sections having a lower Young's modulus and, hence, to reduce the overall stiffness of the load cell.

In a further embodiment, said annular base unit may have a circumferential groove formed in at least one of an outer circumferential wall and an inner circumferential wall thereof, and said plurality of mounting portions and said plurality of strain gages may be located at or in said circumferential groove. The strain gages may thus be protected from external forces, for example, while mounting the load cell at the ground anchor of the structure. Additionally or alternatively, wires connecting the strain gages with associated electronics may be aligned in the circumferential groove. The strain gages may also bridge the circumferential groove in an axial direction, e.g. in a way that a strain gage is mounted on both axial sides of the circumferential groove, but the measuring part of the strain gage itself is located within the circumferential groove.

In order to also provide a load cell that shows a similar effective Young's modulus in a radially outer area of the load cell as well as in a radially inner area of the load cell, a center point of at least some of said holes may be located on a line extending in the middle between an inner circumferential surface and an outer circumferential surface of the base unit. In particular, some, or even all, of the center points of said holes are located on an imaginary circle of the base unit having a radius that amount to the radius of the center bore plus half of the difference between the radius of the center bore and the radius of the outer circumferential surface of the base unit.

Advantageously, said annular base unit may be made of a corrosion-resisting and/or corrosion-protected material and/or may have a corrosion protective coating applied to it. This may enhance the lifetime of the load cell significantly.

Said strain gages may be mounted to be sensitive to strain exerted in an axial direction of said annular base unit. As it is already stated before, the load cell may be used in an application in which forces are introduced into the load cell substantially parallel to the center bore of the base unit and/or substantially perpendicular to at least one axial end surface of the base unit.

Furthermore, said strain gages may be connected in a Wheatstone bridge configuration. This may significantly enhance the measurement accuracy of the load cell.

Also, additional strain gages may be provided and mounted to be insensitive to strain exerted in an axial direction of said annular base unit. These strain gages that are insensitive to strain exerted in an axial direction of said annular base unit may be used to measure and/or detect a temperature or at least a temperature change of the load cell. Since the material(s) of the load cell and of the base unit, respectively, may expand/shrink due to a changing temperature, the strain gages that are adapted to measure forces introduced into the load cell by an attached structure may either wrongly measure introduced forces or may wrongly fail to measure introduced forces, just because the strain gage attached to the load cell is expanding/shrinking together with the material of the base unit. Therefore, the strain gages that are insensitive to strain exerted in an axial direction of said annular base unit may be used to recalibrate the strain gages that are sensitive to strain exerted in an axial direction of said annular base unit and/or to remove the effect of the temperature change from the measurement result of the strain gages that are sensitive to strain exerted in an axial direction of said annular base unit in order to achieve a temperature compensation calculation. The additional strain gages may be wired into the Wheatstone bridge in such a manner that a temperature compensation occurs. In this case a single reading may be required whose output is already temperature compensated. As an alternative, a temperature sensor may be installed on or near the load cell.

Advantageously, the number of additional strain gages that are insensitive to strain exerted in an axial direction of said annular base unit and the number of strain gages that are sensitive to strain exerted in the axial direction of said annular base unit may be the same such that, in total, an even number of strain gages may be provided.

At least some of said strain gages, preferably all strain gages, may be thin film strain gages. Thin film strain gages have the advantage that they substantially do not change the overall dimension of the load cell. Furthermore, thin film strain gages are cheap such that the overall costs of the load cell may be kept low.

The load cell may include a transducer connected to said strain gages and a transmitter for transmitting data received from said transducer via a wireless network. The load cell may transmit data over a wireless network to a logger. The logger may then assemble the data from numerous sensors and communicate with upstream devices to transport the data to a cloud processing system. The cloud processing system, in turn, may convert the raw data to engineering units and persist the raw and calculated data to a storage layer. Data from the storage layer may be subsequently passed to further services for evaluation against alarm conditions and may be made available for display on a visual digital twin of the structure or foundations.

It shall be added that the strain gages may be located on the load cell such that they are accessible and replaceable while load is still applied to the load cell, in particular from an attached structure. For example, by arranging the strain gages in the circumferential groove formed in the outer circumferential wall, the strain gages may be replaced, e.g. in case of malfunctions, without removing the load cell from the structure and/or without the necessity to reduce the load applied to the load cell. This may significantly reduce the complexity and, thus, the costs of maintaining the load cell.

The present invention will be described in greater detail in the following by the example of possible embodiments with reference to the accompanying drawings in which.

Figure 1:
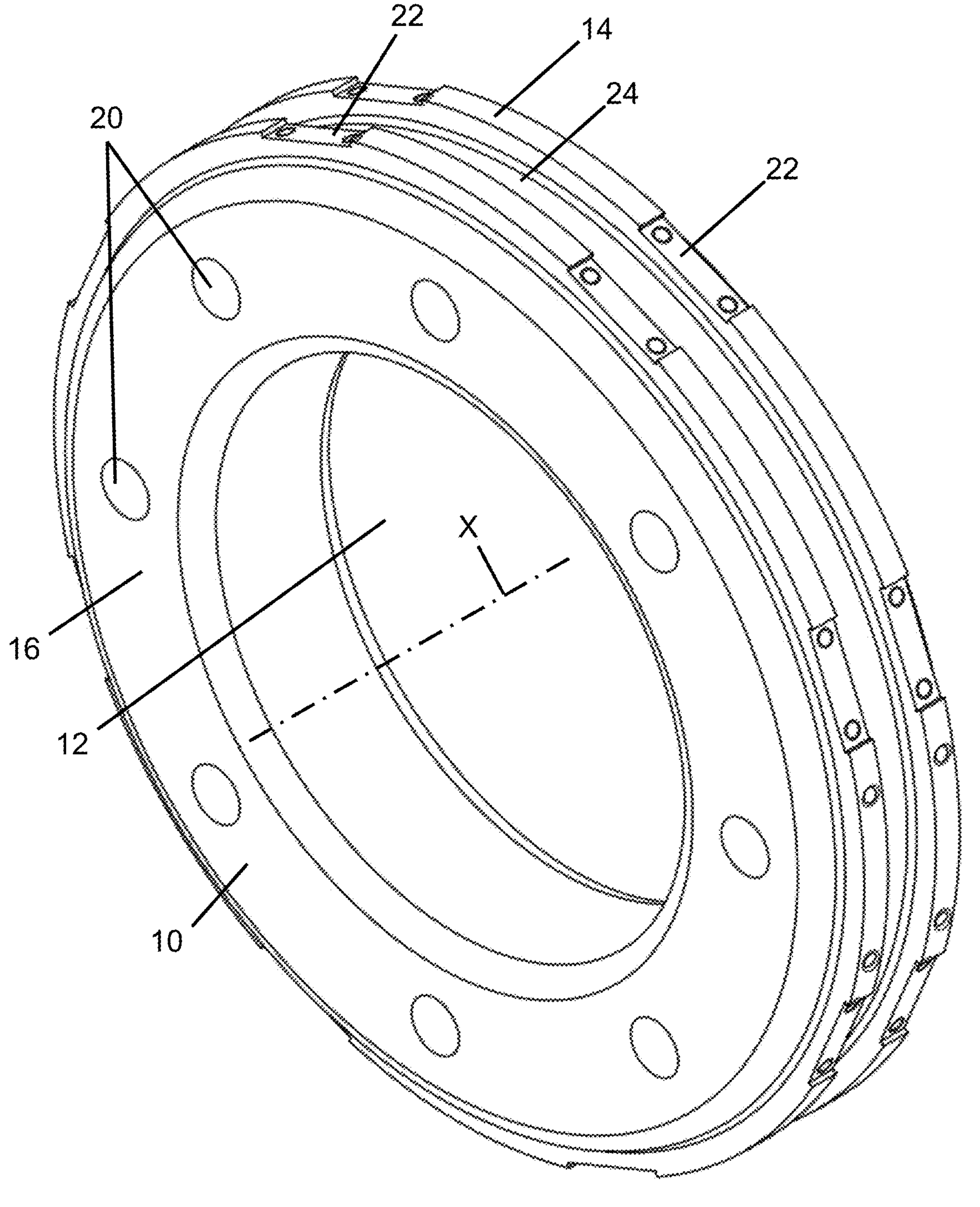
FIG. 1 shows a perspective view of an embodiment of a base unit of a load cell according to the present invention.

In FIG. 1, a base unit of a load cell according to the present invention is generally denoted by the reference numeral 10. The base unit 10 is of an annular shape with an inner diameter (the diameter of the center bore 12) and an outer diameter of the outer circumferential wall 14. The base unit 10 has a first axial end surface 16 and a second axial end surface 18 opposite to the first axial end surface 16 (see FIG. 2). In the shown embodiment, both axial end surfaces 16 and 18 extend perpendicular to the axial direction X of the base unit 10. A distance between the first axial end surface 16 and the second axial end surface 18 defines the axial length of the base unit 10.

The base unit 10 comprises a plurality of through holes 20 that extend from the first axial end surface 16 to the second axial end surface 18. Here, the through holes 20 open to the environment surrounding the base unit 10 and are filled with air at ambient pressure. In the embodiment shown in FIG. 1, eight through holes 20 are evenly distributed in a circumferential direction of the base unit 10 around the center axis X.

By increasing or decreasing the number and/or size of the holes 20, the stiffness and thus the Young's modulus of the base unit 10 can be adjusted. For example, by increasing the number and/or size of the hole 20 in the base unit 10, the stiffness of the base unit 10 is reduced such that a load cell comprising a respective base unit 10 is sensitive to lower forces, compared to a base unit having less or smaller holes 20.

Here, on the outer circumferential wall 14, eight mounting portions 22 are evenly distributed in the circumferential direction of the base unit 10. Each of the mounting portions 22 is adapted to receive a strain gage (see FIG. 3) that is adapted to measure forces that are introduced into the base unit 10, in particular to measure a change of a dimension of the base unit 10. It is to be understood that any convenient number of mounting portions 22 and of strain gages, respectively, is possible.

Figure 2:
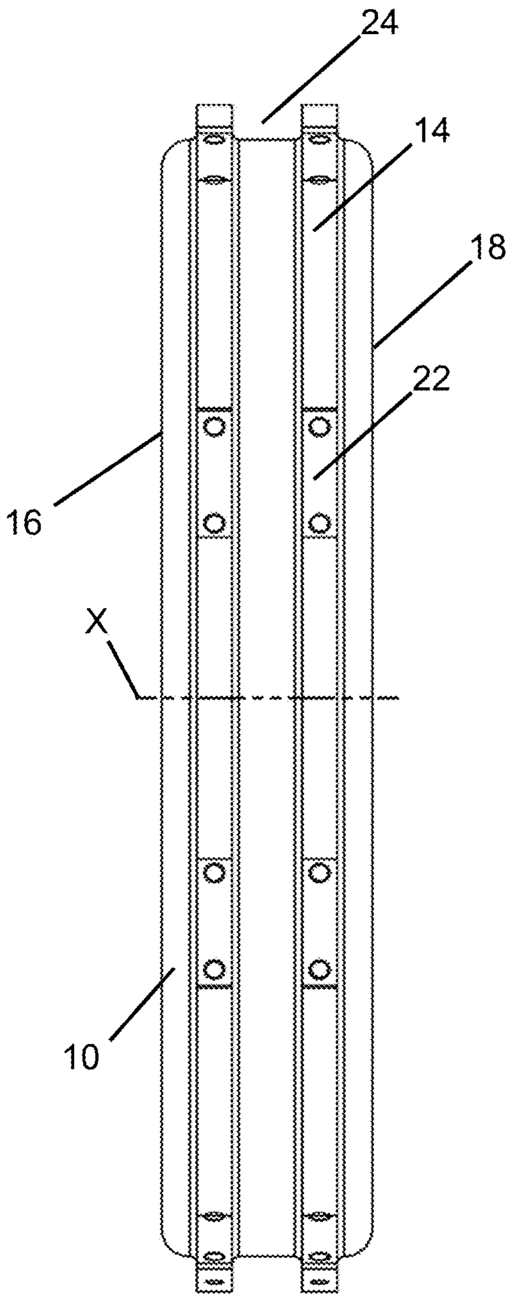
FIG. 2 shows a side view of the base unit of FIG. 1.

As can be seen in FIGS. 1 and 2, a circumferential groove 24 is extending in the outer circumferential wall 14 of the base unit 10 along the circumferential direction of the base unit 10 such that the mounting portions 22 or a strain gage attached thereto, respectively, bridges the circumferential groove 24 in the axial direction of the base unit 10. This may improve the sensitivity of the strain gages with respect to a change of dimension of the base unit 10.

In the shown embodiment, the number and size of the mounting portions 22 is selected such that an angle of 45° extends from one mounting portion 22 to an adjacent one in the circumferential direction of the base unit 10.

In an exemplary embodiment, the diameter of the center bore 12 may be 100 mm, the outer diameter of the base unit 10 may be 170 mm, and the length of the base unit 10 in the axial direction may be 30 mm. The width of mounting portion 22 in the circumferential direction of the base unit 10 may be approximately 20 mm. The depth of the circumferential groove 24 in the radial direction of the base unit 10 may be 5 mm and its width in the axial direction of the base unit 10 may be 10 mm. In an embodiment of the base unit 10 that is adapted for a specific use case, the diameter of each through hole 20 may be 6 mm.

As can be further seen in FIGS. 1 and 2, the first axial end wall 16 and the second axial end wall 18 have a reduced diameter or radius compared to the diameter or radius of the outer circumferential wall 14. This may reduce a beam effect.

Figure 3:
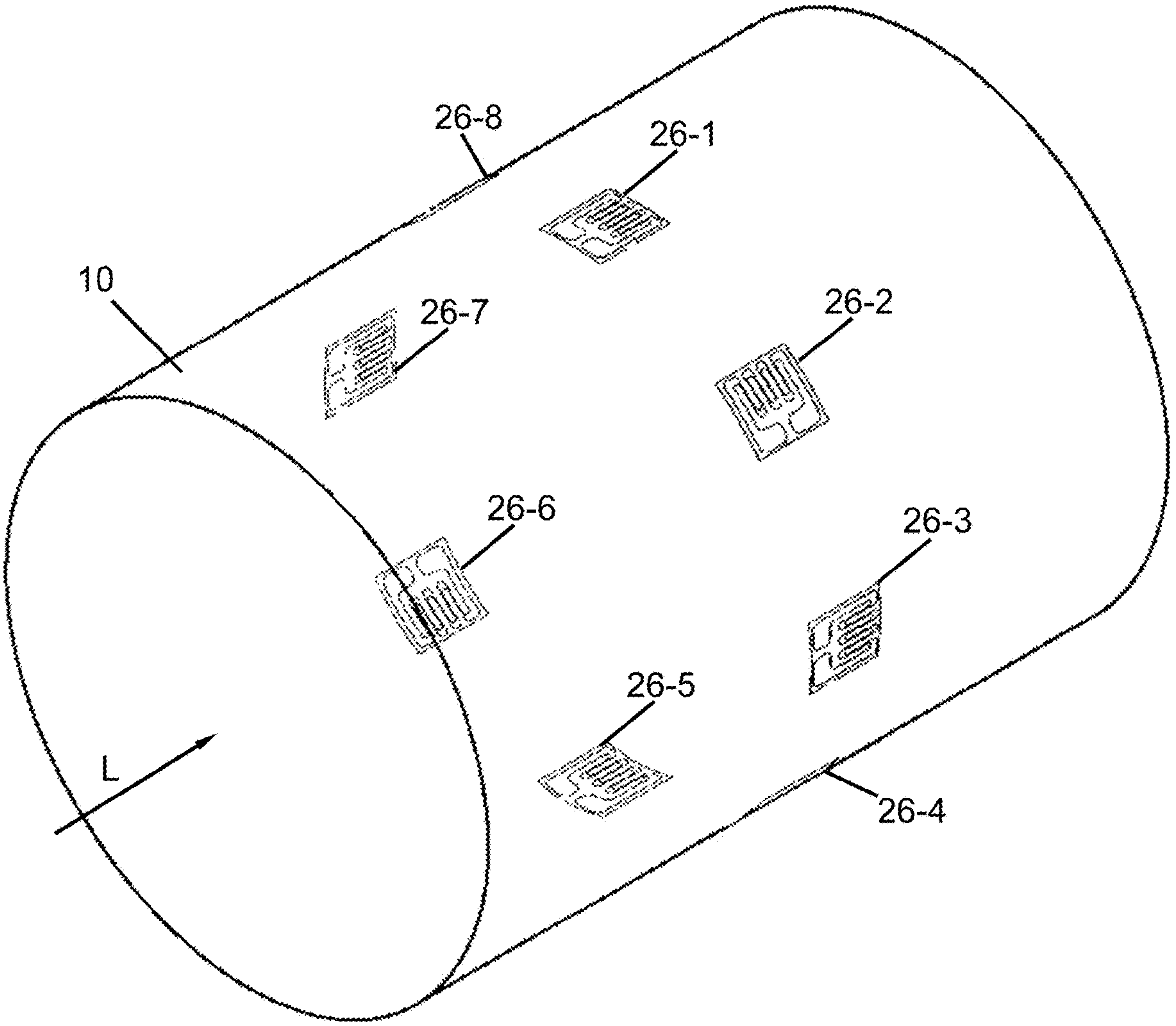
FIG. 3 shows a possible arrangement of strain gages on a schematic perspective view of a load cell.

Now, with reference to FIG. 3, a possible arrangement of strain gages 26-1 to 26-8 is shown that may be attached to the eight mounting portions 22 of the base unit 10 of FIGS. 1 and 2. In FIG. 3, the base unit 10 is only shown schematically as a cylinder 10.

It can be seen in FIG. 3 that the strain gages 26-1, 26-3, 26-5 and 26-7 are attached to the base unit 10 in a manner rotated by 90° with respect to the strain gages 26-2, 26-4, 26-6 and 26-8. As a result, only the strain gages 26-1, 26-3, 26-5 and 26-7 are sensitive to axial forces that are introduced into the base unit 10 in a direction that is substantially parallel to the arrow L. The remaining strain gages 26-2, 26-4, 26-6 and 26-8 that are sensitive with respect to a change of a diameter of the base unit 10, for example, may be used to provide data for a temperature compensation of the measurement results of the strain gages 26-1, 26-3, 26-5 and 26-7, since the material of the base unit 10 is increasing/decreasing in any direction due to a change of temperature.

Figure 4:
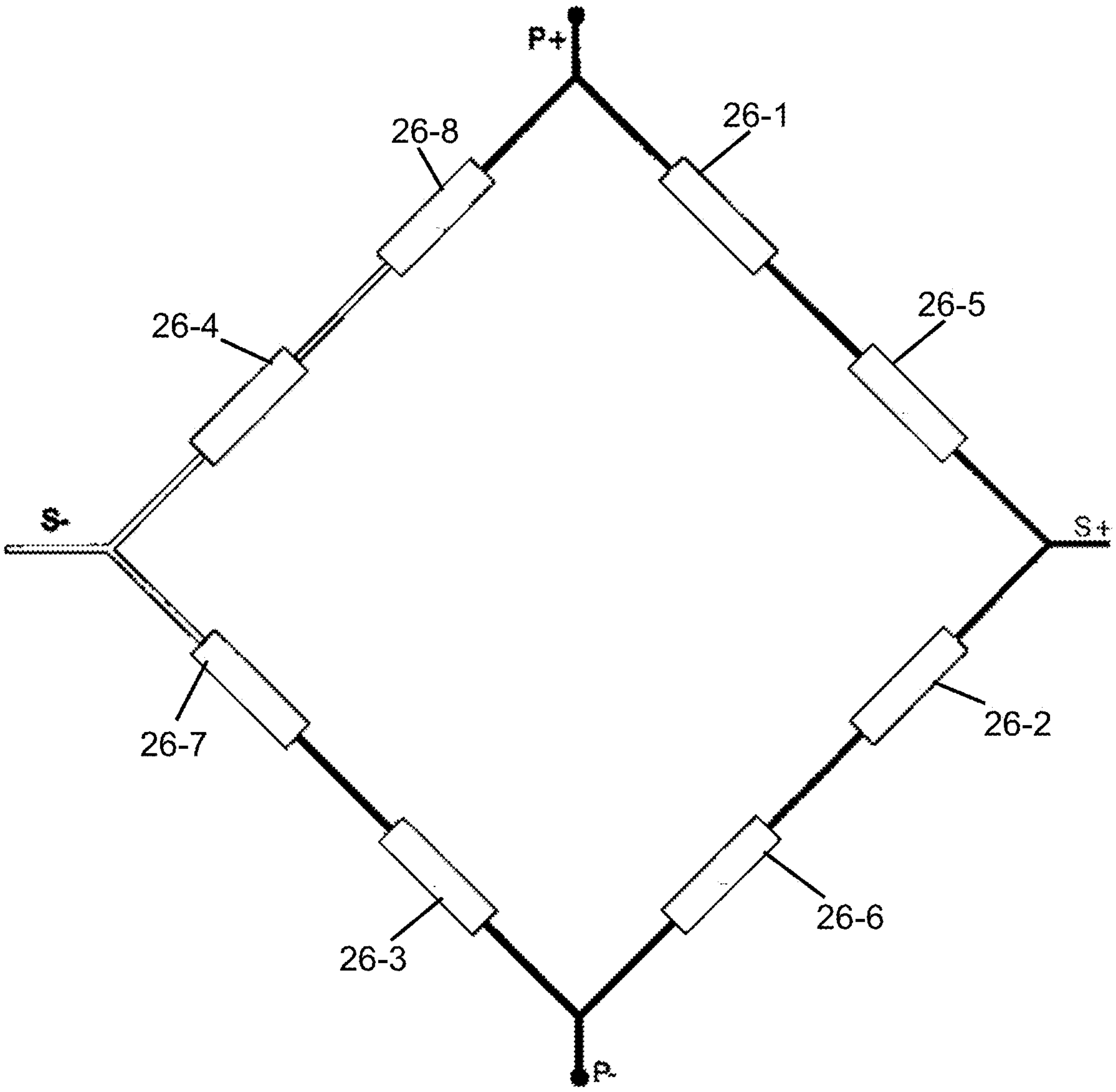
FIG. 4 shows a possible scheme of connection of the strain gages of FIG. 3.

With reference now to FIG. 4, it is to be understood that the strain gages 26-1 to 26-8 do not have to be connected from one strain gage to a neighboring strain gage directly, but may be connected arbitrarily, in particular as it is shown in FIG. 4. Starting at the top of FIG. 4, the "+"-side of an excitation of the arrangement of strain gages is indicated by "P+" in between strain gage 26-8 and strain gage 26-1. The strain gage 26-1 is connected to the strain gage 26-5. The strain gages 26-5 and 26-2 are both connected to a "+"-side of a signal pathway. The strain gage 26-2 is then connected to the strain gage 26-6. The strain gages 26-6 and 26-3 are connected to a "–"-side of the excitation described above.

The strain gage 26-3 is also connected to the strain gage 26-7. Both of the strain gages 26-7 and 26-4 are connected to a "–"-side of the signal pathway. Finally, the strain gage 26-4 is connected to the strain gage 26-8.

Figure 5:
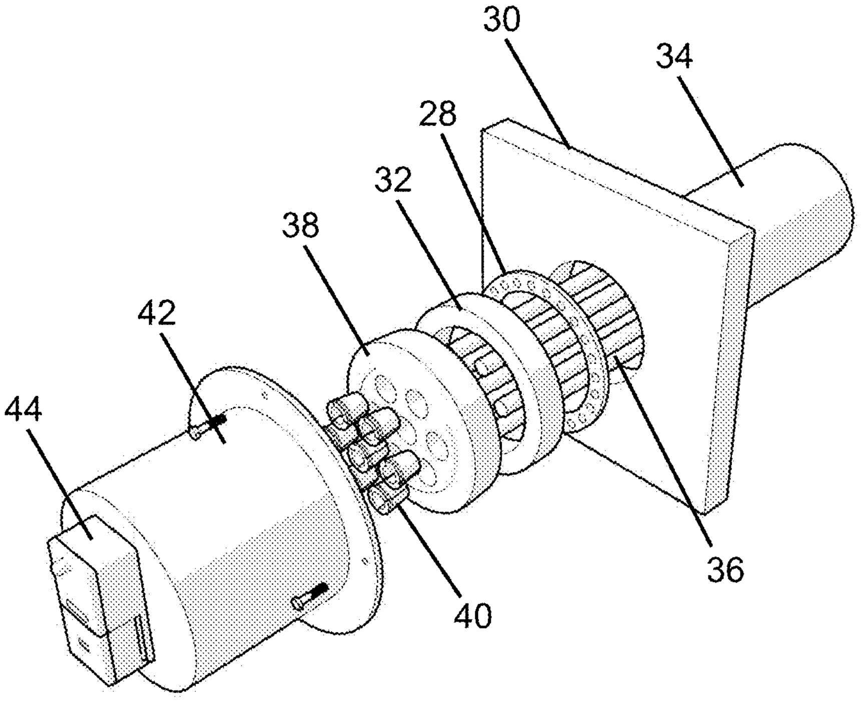
FIG. 5 shows an exploded view of a possible arrangement of the load cell according to the present invention at an anchor of a structure.

In FIG. 5, an exploded view of a possible arrangement of the load cell according to the present invention at an anchor of a structure is shown. In FIG. 5, a load cell 28 that comprises the base unit 10 described above is arranged between an anchor plate 30 and a bearing plate 32. On the opposite side of the anchor plate 30, an anchor strand tube 34 is disposed. The load cell 28 may be provided with a gasket at least on one of the first axial end surface 16 and the second axial end surface 18. Cables 36 that extend centrally through the anchor strand tube 34, the bearing plate 32, the load cell 28, the anchor plate 30, and a wedge plate 38 that is arranged on a side of the bearing plate 32 opposite to the load cell 28 (at least in the arrangement shown in FIG. 5) are connected to wedges 40 such that a fixation for the cables 36 is provided by an interaction of the cables 36, the wedges 40, and the wedge plate 38.

The cable ends located in the wedge plate 38 are then covered by a steel cap 42 that surrounds the wedge plate 38 and that is connected to the anchor plate 30. In the shown embodiment, a wireless transmitter module 44 is attached to the steel cap 42 that is adapted to receive data from the strain gages 26-1 to 26-8 and to transmit the received data to an external device, such as a server and/or a user terminal, e.g. a cell phone.

Figure 6A:
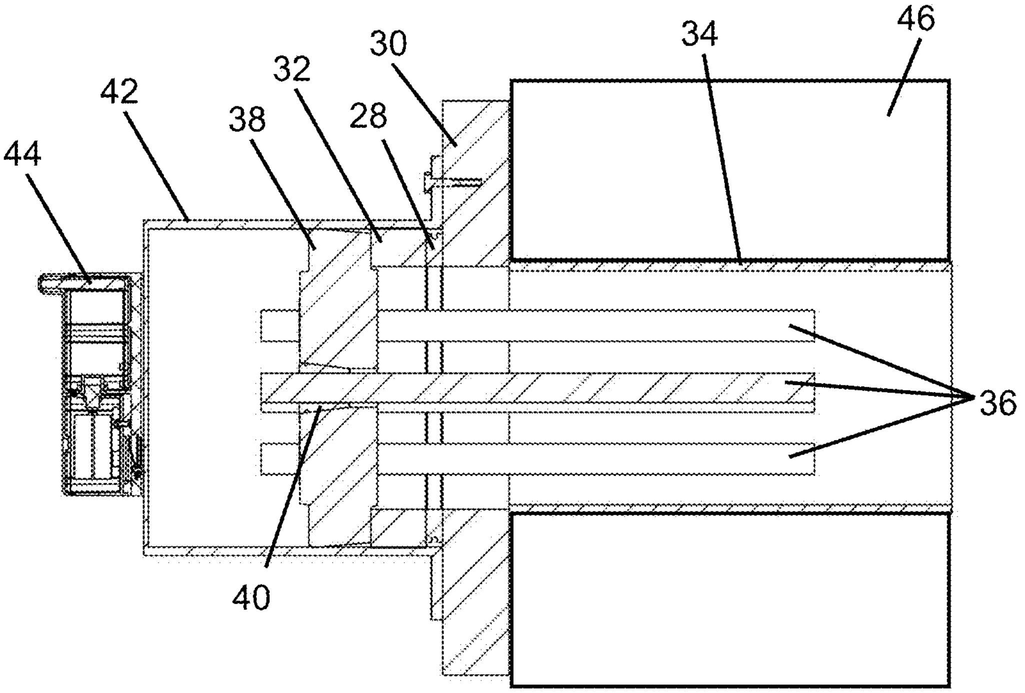
FIGS. 6*a* and 6*b* show possible variations of the arrangement of FIG. 5.

The arrangement of FIG. 5 is also shown in FIG. 6*a* in a sectional side view. Here, the anchor strand tube 34 and the cables 36 extend through a structure 46, such as a bridge pole.

In the following, an alternative arrangement to the arrangement in FIGS. 5 and 6*a* is described, wherein only the components are described, the arrangement of which is changed with respect to the arrangement of FIGS. 5 and 6*a*. For all other components of FIG. 6*b*, the description given with respect to FIGS. 5 and 6*a* may still be applicable.

Figure 6B:
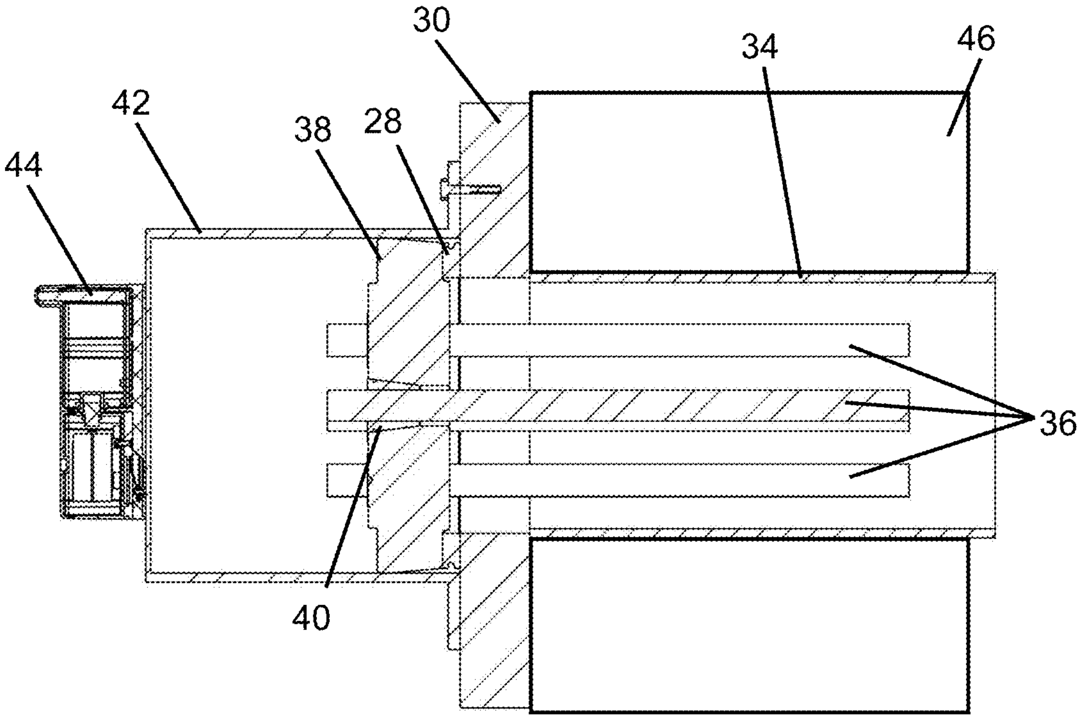

In FIG. 6*b*, the load cell 28 is arranged in between the wedge plate 38 and the anchor plate 30 directly. Therefore, the bearing plate 32 may be omitted.

In both of the above-shown examples of FIGS. 6*a* and 6*b*, the load cell 28 may be provided as a separate element or may be provided as an integrated part of the wedge plate 38, of the anchor plate 30 or of the bearing plate 32.

The invention claimed is:

1. A load cell, comprising
an annular base unit,
an axial height of said annular base unit being smaller than a diameter of said annular base unit,
said annular base unit having a plurality of mounting portions, and
a plurality of strain gages,
said plurality of strain gages being located in the plurality of mounting portions,
wherein said annular base unit comprises a plurality of sections having a Young's modulus different from the Young's modulus of the material of the base unit,
wherein the plurality of strain gages is directly attached to an outer surface of a circumference of the base unit without any intervening structural element between the plurality of strain gages and the base unit.

2. The load cell according to claim 1,
wherein at least some sections of said plurality of sections are formed by holes provided in said annular base unit.

3. The load cell according to claim 2,
wherein at least some of said holes extend in an axial direction of said annular base unit.

4. The load cell according to claim 2,
wherein at least some of said holes are through holes opening into both axial surfaces of the base unit.

5. The load cell according to claim 2,
wherein said holes are evenly distributed along a circumferential direction of said annular base unit.

6. The load cell according to claim 2,
wherein at least some of said holes have a circular cross-section.

7. The load cell according to claim 2,
wherein said annular base unit has a circumferential groove formed in at least one of an outer circumferential wall and an inner circumferential wall thereof, and
said plurality of mounting portions and, hence, said plurality of strain gages is located in said circumferential groove.

8. The load cell according to claim 1,
wherein a center point of at least some of said holes is located on a line extending in the middle between an inner circumferential surface and an outer circumferential surface of the base unit.

9. The load cell according to claim 1,
wherein said annular base unit is made of a corrosion-resisting and/or corrosion-protected material and/or has a corrosion protective coating applied to it.

10. The load cell according to claim 1,
wherein said strain gages are mounted to be sensitive to strain exerted in an axial direction of said annular base unit.

11. The load cell according to claim 1,
wherein said strain gages are connected in a Wheatstone bridge configuration.

12. The load cell according to claim 1,
wherein additional strain gages are provided and mounted to be insensitive to strain exerted in an axial direction of said annular base unit.

13. The load cell according to claim 1,
wherein at least some of said strain gages are thin film strain gages.

14. The load cell according to claim 1,
wherein the load cell includes a transducer connected to said strain gages and a transmitter for transmitting data received from said transducer via a wireless network.

15. The load cell according to claim 1,
wherein the strain gages are located on the load cell such that they are accessible and replaceable while load is still applied to the load cell from an attached structure.

16. The load cell according to claim 1,
wherein said annular base unit has a circumferential groove formed in an outer circumferential wall thereof,
wherein said plurality of mounting portions comprises a first set of mounting portions located in recesses formed in said outer circumferential wall on a first axial side of said circumferential groove, and a second set of mounting portions located in recesses formed in said outer circumferential wall on a second axial side of said circumferential groove opposite said first axial side,
wherein said first set of mounting portions and said second set of mounting portions are circumferentially aligned with each other such that each mounting portion of said first set is paired with a corresponding mounting portion of said second set across said circumferential groove, and wherein each of said strain gages bridges said circumferential groove in an axial direction of said annular base unit with a measuring part of said strain gage located within said circumferential groove.

17. The load cell according to claim 1, wherein the axial height of said annular base unit is less than 25% of the diameter of said annular base unit.

18. The load cell according to claim 1, wherein at least one axial end surface of said annular base unit has a diameter smaller than a maximum diameter of said annular base unit at its outer circumferential wall, thereby forming a relief portion at said at least one axial end surface that reduces a beam effect on said annular base unit.

* * * * *